MULTIPLIER-DIVIDER USING RESOLVERS

Filed Nov. 14, 1963 3 Sheets-Sheet 1

INVENTOR
John A. Dolan
BY
James A. Lamb
PATENT AGENT

MULTIPLIER-DIVIDER USING RESOLVERS

Filed Nov. 14, 1963 3 Sheets-Sheet 2

INVENTOR
John A. Dolan
BY James A. Lamb
PATENT AGENT

MULTIPLIER-DIVIDER USING RESOLVERS

Filed Nov. 14, 1963 3 Sheets-Sheet 3

INVENTOR
John A. Dolan
BY
James A. Hanley
PATENT AGENT

United States Patent Office 3,358,127

Patented Dec. 12, 1967

3,358,127

MULTIPLIER-DIVIDER USING RESOLVERS

John A. Dolan, Ville St., Laurent, Quebec, Canada, assignor to Computing Devices of Canada Limited, Ottawa, Ontario, Canada Filed Nov. 14, 1963, Ser. No. 323,774

7 Claims. (Cl. 235—150.271)

Figure 1:
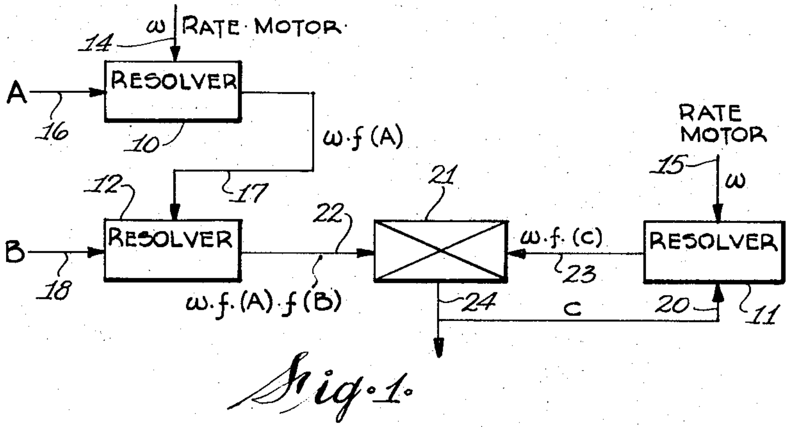

This invention relates to computer apparatus, and in particular it relates to computer apparatus for performing operations involving multiplication and division.

The invention is primarily concerned with analog computers although it may have an application in digital computers as will be discussed hereinafter.

In prior analog computers it can be observed that operations of multiplication, division and function generation tend to be less accurate than operations of addition and subtraction. Also, in certain prior computer apparatus the input values or input signals are sometimes required in a form that is not convenient.

One well known manner of multiplication uses a wire wound potentiometer as a prime element. In this manner of multiplication, an exciting voltage representing one input is applied across the potentiometer, and the wiper arm is positioned to represent another input value. The voltage available at the wiper arm represents the product of the two inputs. If a linear potentiometer is used there will be linear multiplication of the two input signals. If a potentiometer wound in a functional arrangement is used there will be multiplication of a function of a shaft position value, such as a trigonometric function of a shaft position value, by a value represented by the exciting voltage.

There are disadvantages associated with potentiometer types of multiplication. For example, accurate potentiometers are relatively expensive, and the cascading of potentiometers to achieve repetitive multiplication results in loading errors unless some form of buffering is used between stages.

Another known manner of multiplication uses AC analog elements such as induction resolvers in a manner similar to the previously discussed form of multiplication using potentiometers. As before, when successive stages of multiplication are required, there are problems of loading including problems of accumulating phase shift errors.

Yet another known manner of achieving multiplication and trigonometric resolution uses a ball resolver. In this manner of multiplication, a ball or sphere is rotated about an axis at a rotational speed representing one input value, and a pick-off roller engages the sphere surface at a position representing another input value. That is, one input is a driving input whose speed represents one value, while the other input is a shaft position input whose position represents the other value. The speed of the pick-off roller is the output and represents the driving analog input times a trigonometric functions (such as sine or cosine) of the shaft position analog input. This may be referred to as a rate multiplication.

The term "rate multiplication" as used herein is intended to mean the multiplication of two input values, at least one of which is represented by a rate, to provide an output representing the product. In the case of the previously discussed manner of multiplication using ball resolvers, the driving input and the output are analog rate values. Multiplication by rates is convenient, accurate and suitable for many applications, but, as in the previously discussed case, it is often difficult to provide the driving input as an analog value and it is often difficult to utilize the output conveniently as a rate analog value.

The present invention based on the discovery that by combining simple function generators or resolvers and associated apparatus in a certain relationship, rate multiplication can be achieved using proportional inputs and outputs. Generally, the apparatus of the invention is suitable for solving an equation of the type $f(C)=f(A).f(B)$ where $f$(C), $f$(A) and $f$(B) are functions of C, A and B which can be simply developed as rates and where C, A and B are positional or non-rate values. Preferably $f$(C), $f$(A) and $f$(B) are trigonometric functions developed by ball resolvers.

It is an object of the present invention to provide improved computer apparatus of novel design for performing rate multiplication and division of analog values of functions of positional inputs and providing a positional output analog value.

It is another object of the invention to provide a computer apparatus for solving an equation of the type $$f(C)=f(A).f(B)$$

for C using a rate multiplication where $f$(C), $f$(A), and $f$(B) are functions of C, A, and B which can be developed as rates, and where C, A, and B are positional analog values.

Figure 3:
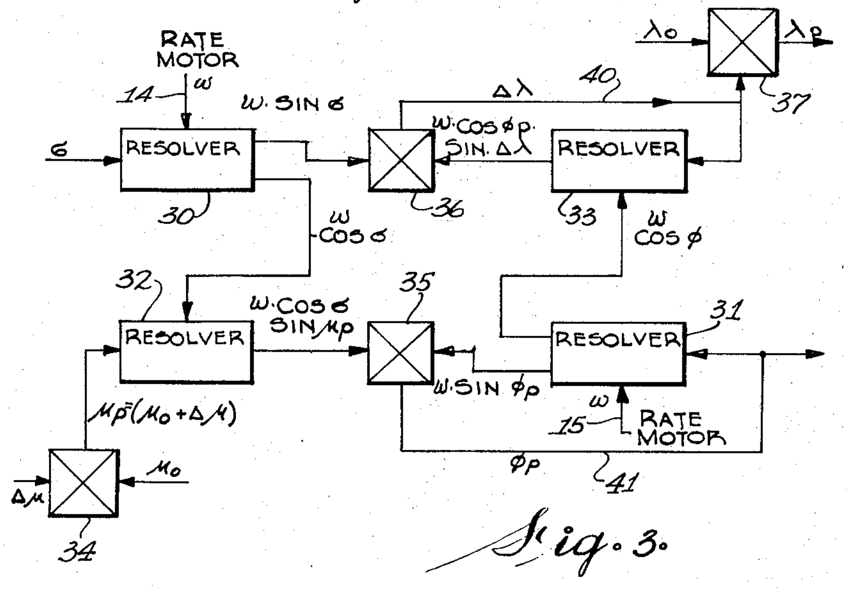
Figure 2:
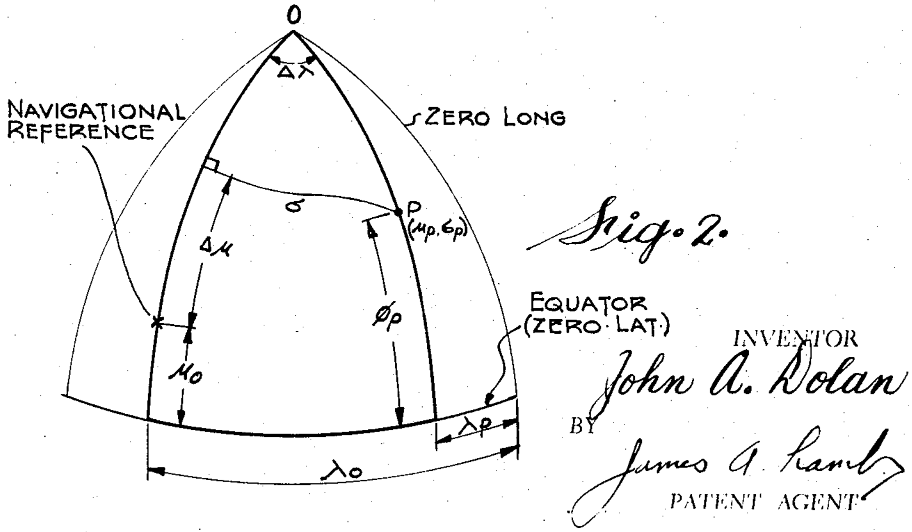
Figure 4:
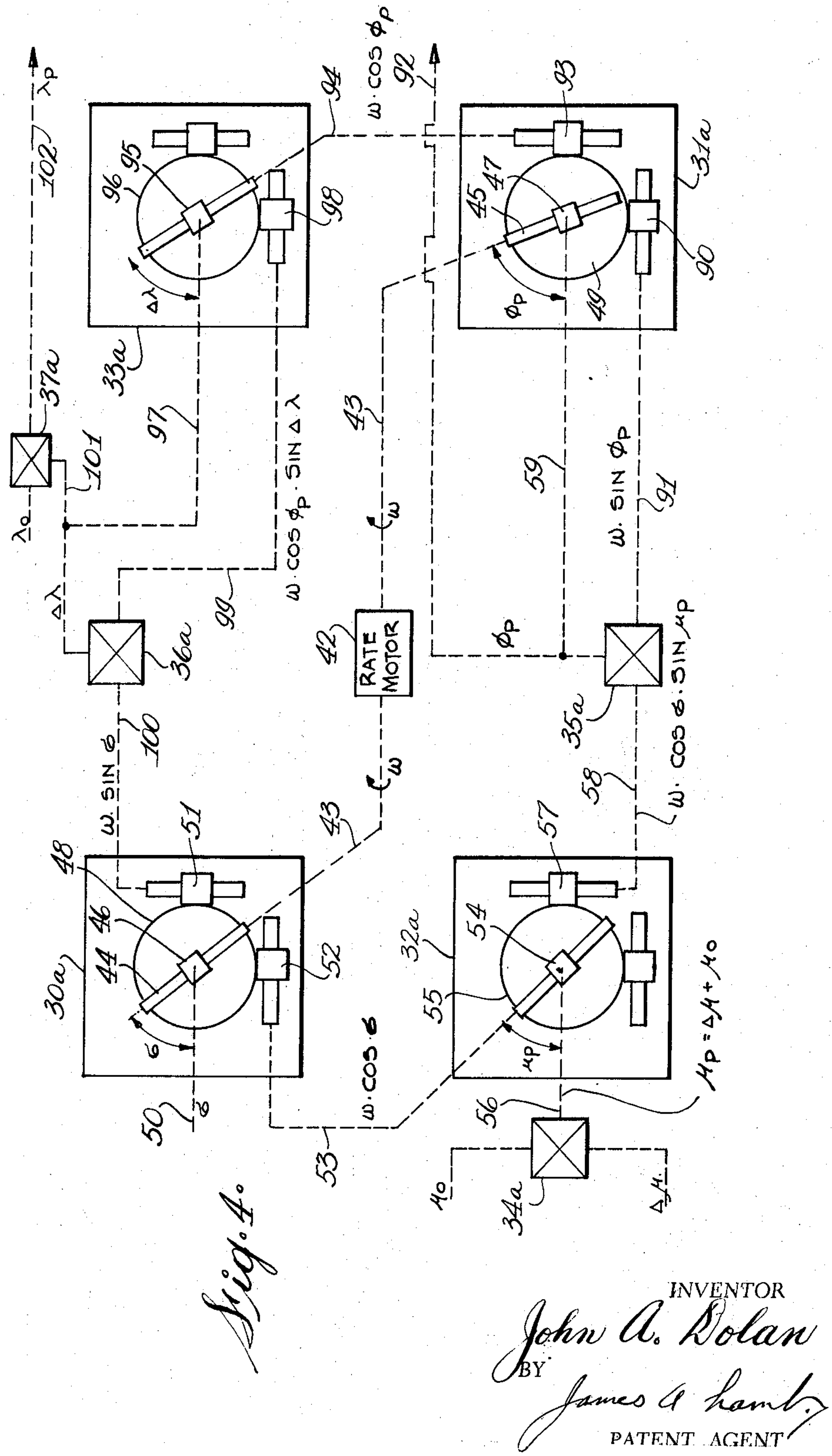
Figure 5:
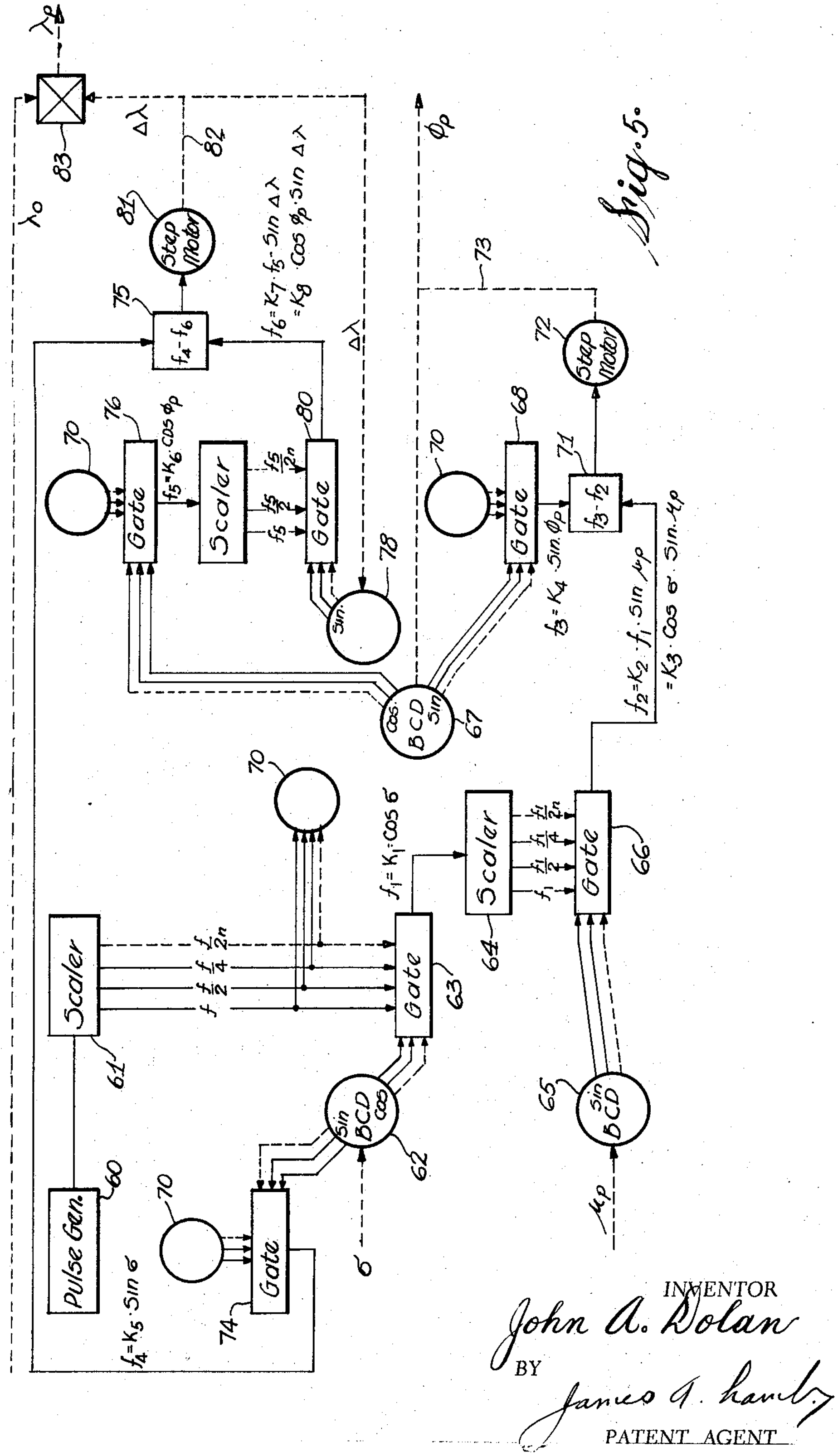

Other objects and advantages of the invention will appear from the following description taken in conjunction with the accompanying drawings, in which:

FIGURE 1 is a simplified block diagram showing apparatus in accordance with the invention, FIGURE 2 is a schematic drawing of a portion of the earth useful in describing the operation of an embodiment of the invention adapted to solve a navigational problem, FIGURE 3 is a simplified block diagram showing apparatus in accordance with an embodiment of the invention adapted to solve the navigational problem illustrated in FIGURE 2, FIGURE 4 is a diagrammatic representation of a preferred form of the embodiment of FIGURE 3, and FIGURE 5 is a simplified block diagram showing apparatus in accordance with another embodiment of the invention.

Briefly, the invention is for a computer apparatus for solving an equation of the form $f(C)=f(A).f(B)$ for C where $f$(C), $f$(A) and $f$(B) are functions of C, A and B respectively, comprising first, second and third mechanical resolvers each having at least a driving input, a positional input and a rate output, rate motor means connected to the driving input of said first and second resolvers to drive said first and second resolvers at the same speed, means applying positional signals representing A and B to the positional inputs of said first and third resolvers repsectively, said first resolver forming a rate output signal $f$(A) at its output, means connecting the output of said first resolver to the driving input of said third resolver to drive said third resolver at a rate $f$(A), said third resolver forming a rate output signal $f(A).f(B)$ at its output, means applying a positional signal C to the positional input of said second resolver, said second resolver forming a rate output signal $f$(C) at its output, differential means connected to the outputs of said third and second resolvers receiving respectively therefrom said signal $f(A).(f(B)$ and said signal $f$(C) and forming a positional signal C as an output and as a feedback signal for the positional input of said second resolver.

Referring now to FIGURE 1, the blocks 10, 11 and 12 represent mechanical function generators. In a preferred form these may be resolvers such as ball resolvers. The generators or resolevers each have a driving input, a positional input and a rate output. In the case of ball resolvers, the driving input is to a roller which engages the ball surface to rotate the ball, the positional input is a shaft input which positions the driving roller and thus the direction in which the ball rotates, and the rate output is the rotational speed of a pick-up roller engaging the ball surface. Such resolvers are well known. In the FIGURE 1 arrangement, a rate motor drive, indicated by arrows 14 and 15, is connected to the driving inputs of resolvers 10 and 11 to drive them at the same rate. It should be noted that this rate motor has a rotational speed of $\omega$ which is not an analog value as in the prior art arrangements. The driving rate $\omega$ may be any value sufficient to provide an adequate response in the system as will be realized in the subsequent description. A positional input signal representing a value A is applied to resolver 10 at its positional input indicated by arrow 16, and a rate output signal $\omega.f(A)$ is formed. The output of resolver 10 and the driving input of resolver 12 are interconnected as indicated at 17 to drive resolver 12 at a speed $\omega.f(A)$. A positional input signal representing B is applied to resolver 12 at its positional input indicated by arrow 18, and a rate output signal $\omega.f(A).f(B)$ is formed at the output resolver 12.

A positional input signal representing C, whose source will become apparent as the description proceeds, is applied to resolver 11 as indicated at 20, and an output signal $\omega.f(C)$ is formed. The outputs of resolvers 12 and 11 are connected to a differential 21 as indicated by 22 and 23, and the differential 21 provides a positional output or shaft output at 24 whose position represents C. The value C is the required output signal and also, it is used as an error or feedback signal to resolver 11.

In other words, the apparatus is arranged to maintain the equation $$\omega.f(C)=\omega.f(A).f(B) \quad (1)$$

or $$\omega[f(C)-f(A).f(B)]=0 \quad (2)$$

or $$f(C)-f(A).f(B)=0 \quad (3)$$

The accumulation of C may be described as $$C=K\int_{t_0}^{t_1}\omega[f(C)-f(A)\cdot f(B)]dt+C_0 \quad (4)$$

where $t_0$ and $t_1$, are the times between which the function represented by Equation 3 is not zero. For example, when the apparatus is started at time $t_0$, the differential output shaft 24 will not normally be at a position where the Equation 3 would equal zero. It may have an initial shaft position represented by $C_0$. At a time $t_1$, i.e. $(t_1-t_0)$ seconds later, the shaft 24 will have taken a position representing C as set forth in Equation 4. The constant K represents the system gearing.

It will be seen that the apparatus performs a rate multiplication, and that the inputs and the output are shaft positions. It will also be seen that the speed $\omega$ at which the rate motor runs does not affect the operation of multiplication. The speed $\omega$ will, however, have an effect on the rate at which the system responds and a driving speed should be selected to provide a suitable response for the use to which the apparatus is put.

Referring now to FIGURE 2, a specific problem is shown for which the computer apparatus of this invention is well adapted to solve. In aircraft navigational computers it is frequently desirable to use a grid reference system having north-south and east-west coordinates, i.e. grid parallels and meridians which may be rotated 90° from the standard navigational latitude and longitude system. Such a grid system may be used, for example, to circumvent problems in polar navigation. In practice, a transverse grid reference system may be used where the poles are located on the earth's equator and where $\mu$ is quivalent to longitude in the standard system and $\sigma$ is similar to latitude and develops at 90° to $\mu$. An aircraft having a present position P ($\mu_p$, $\sigma_p$ in the transverse grid system) may require its position in terms of standard latitude $\phi_p$ and longitude $\lambda_p$. As seen in FIGURE 2, a portion of the earth is depicted with a reference position which may have coordinates $\mu_o$, $\lambda_o$. The incremental distance or change between the reference and present position taken along a reference meridian passing through the reference position is $\Delta\mu$. The distance of the present position from this reference meridian measured at right angles to the meridian is $\sigma$. The actual change in longitude between the reference and the present position is designated $\Delta\lambda$.

From this it will be apparent that $$\mu_p=\mu_o+\Delta\mu \quad (5)$$

$$\lambda_p=\lambda_o-\Delta\lambda \quad (6)$$

It will be seen that a spherical right angled triangle is formed and the following relationships exist:

$$\sin\phi_p=\cos\sigma.\sin\mu_p \quad (7)$$

$$\sin\Delta\lambda=\frac{\sin\sigma}{\cos\phi_p} \quad (8)$$

The arrangement of apparatus of FIGURE 3 uses these relationships to provide output signals representing latitude $\phi_p$ and longitude $\lambda_p$ when provided with the coordinates of the reference $\mu_o$, $\lambda_o$ and the information from the aircraft navigational equipment $\Delta\mu$ and $\sigma$.

Referring now to FIGURE 3, there is shown an arrangement of resolvers and differentials operating basically in the manner of the FIGURE 1 arrangement. The arrangement in FIGURE 3 is symmetrical and comprises four ball resolvers 30, 31, 32 and 33. Resolver 30 is driven by a rate motor at 14 at a speed $\omega$ as before, and receives a shaft position signal representing $\sigma$. Resolver 30 forms two rate output signals sin $\sigma$ and cos $\sigma$. That is( the two output signals may be referred to as $\omega.\sin\sigma$ and $\omega.\cos\sigma$. The output of resolver 30 carrying the $\omega.\cos\sigma$ signal is connected to drive resolver 32 at a speed $\omega.\cos\sigma$. A differential 34 receives shaft position input signals $\mu_o$ and $\Delta\mu$ and provides an output signal $\mu_p=\mu_o+\Delta\mu$. The output of differential 34 is connected to the shaft position input of resolver 32 which forms an output signal $\omega.\cos\sigma.\sin\mu_p$. This is applied as one input to a differential 35.

Resolver 31, which is driven by a rate motor at 15 at a speed $\omega$, receives a shaft position signal representing $\phi_p$ and forms output signals $\omega.\sin\phi_p$ and $\omega.\cos\phi_p$. The output carrying the rate output signal $\omega.\sin\phi_p$ is connected as the other input to differential 35. The rate portion or $\omega$ portion of the two signals applied to differential 35 cancel out and a shaft position output is formed representing the required latitude $\phi_p$. This signal $\phi_p$ is also used as a feedback signal to resolver 31 to maintain the relationship of Equation 7.

The other rate output signal from resolver 31 is used to drive resolver 33 at a rate $\omega.\cos\phi_p$. A shaft position input signal representing $\Delta\lambda$ is applied to resolver 33 and an output signal $\omega.\cos\phi_p.\sin\Delta\lambda$ is formed. This output signal is applied as one input to a differential 36 and the output $\omega.\sin\sigma$ from resolver 30 is applied as the other input to differential 36. A shaft position signal $\Delta\lambda$ is formed as an output from differential 36, and this is used as a feedback signal to resolver 33 to control the output so as to maintain the relationship of Equation 8. The signal $\Delta\lambda$ is also applied to a differential 37 as one input and a signal representing $\lambda_o$ is applied to the other input. The output signal from differential 37 is the required longitude $\lambda_p$ in accordance with Equation 6.

The arrangement of FIGURE 3 is reversible. That is, it will convert $\phi_p$, $\lambda_p$ into $\Delta\mu$, $\sigma$. To do this, the feedback paths designated 40 and 41 would be connected to the shaft position inputs of resolvers 30 and 32 rather than 33 and 31, respectively.

A suitable mechanization of the computer arrangement of FIGURE 3 is shown diagrammatically in FIGURE 4.

In FIGURE 4, a rate motor 42 is shown rotating a shaft 43 which is coupled to the driving inputs of resolvers 30*a* and 31*a* to rotate driving shafts 44 and 45 carrying driving rollers 46 and 47, respectively. The rate motor, operating at a speed $\omega$, rotates driving rollers 46 and 47, and these rollers engage the surface of balls 48 and 49 to drive them at a speed proportional to $\omega$. The angular position of shaft 44 and 45 determines the direction in which ball 48 and 49 rotates, and the position of these shafts 44 and 45 may be controlled.

In resolver 30a the position of shaft 44 is controlled by input shaft 50 carrying signal $\sigma$ as indicated. The speed of pick up rollers 51 and 52 rotate at speeds representing $\omega.\sin \sigma$ and $\omega.\cos \sigma$. The operation of such ball resolvers is well known. A shaft 53 couples the pick-up roller 52 to the driving input of resolver 32a causing the driving roll 54 to drive ball 55 at a speed representing $\omega.\cos \sigma$. The shaft coupling 53, and any other such coupling, may include a torque amplifier if the load is such that it is necessary in practice. However, it has been found that by keeping components light, friction low, and reasonable loads, that torque amplifiers are normally not required.

An input shaft 56 positions driving roller 54 in accordance with a vlue $\mu_p=\mu_0+\Delta_\mu$, and a pick-up roller 57 rotates at a speed representing $\omega.\cos \sigma.\ \sin \mu_p$. A shaft 58 couples roller 57 to one side of differential 35a. An input shaft 59 of resolver 31a positions the driving shaft 45 with driving roller 47 in accordance with $\phi_p$, and a pick-up roller 90 rotates at a speed $\omega.\sin \phi_p$. Roller 90 is coupled to the other side of differential 35a by a shaft 91. The differential output representing $\phi_p$ is used as an output at 92, and by means of shaft 59 positions driving roller 47.

The pick-up roller 93 of resolver 31a is coupled by shaft 94 to the driving input of resolver 33a rotating the driving roller 95 to drive ball 96 at a speed representing $\omega.\cos \phi_p$. A shaft 97 positions the driving roller 95 according to a signal $\Delta\lambda$, and a pick-up roller 98, rotating at a speed representing $\omega.\cos \phi_p$, $\sin \Delta\lambda$ is coupled by shaft 99 to one side of a differential 36a. The other side of differential 36a is coupled to pick-up roller 51 of resolver 30a by shaft 100 to drive the differential at a speed representing $\omega.\sin \sigma$. The output of differential 36a is a shaft position signal $\Delta\lambda$ and this is coupled by a shaft 101 to position one input of differential 37a and by shaft 97 to position the driving rollers 95 of resolver 33a. Another shaft position input to differential 37a is $\lambda_o$ to provide an output on shaft 102 $\lambda_p=\lambda_o-\lambda$.

It was previously mentioned that the invention could be adapted for a digital computer. This adaptation will be described in connection with FIGURE 5.

In FIGURE 5, a moderately stable square wave pulse generator 60 supplies a train of pulses to a scaler 61 in a manner analagous to the rate motor drive of the previously described embodiments. The scaler 61 provides a series of pulse frequencies of $$f, \frac{f}{2}, \frac{f}{4} \cdots \frac{f}{2^n}$$

where $n$ is dependent on the accuracy required. These frequencies are used to control six gates in various parts of the computer, and the source of these frequencies is indicated in the various parts by the designation 70. The gates in association with sine-cosine binary discs, i.e., binary coded discs, form pulse trains proportional to particular sine or cosine values. The formation of pulse trains in this manner is well known in the art.

The shaft of a sine-cosine binary coded disc 62 is positioned to an angle $\sigma$. A binary value of cos $\sigma$ is read from the disc and fed in parallel to gating circuit or gate 63 which selects at corresponding binary levels from the frequencies $$f, \frac{f}{2} \frac{f}{4} \cdots \frac{f}{2^n}$$

to form a pulse train representing $$f_1=k_1\cdot\cos \sigma \qquad (9)$$

The pulse train $f_1$ then acts as a source frequency for a scaler 64 producing, $$f_1, \frac{f_1}{2}, \frac{f_1}{4} \cdots \frac{f_1}{2^n}$$

In a similar manner, a binary coded disc 65 is positioned to an angle $\mu_p$ and the binary value of sin $\mu_p$ is fed to gate 66 which provides a pulse train $$f_2=k_2\cdot f_1\cdot\sin \mu_p=k_3, \cos \sigma\cdot\sin \mu_p \qquad (10)$$

The binary coded disc 67 has its shaft in a position representing $\phi_p$ and the binary value of sin $\phi_p$ is fed to gate 68 to provide a pulse train $$f_3=k_4\cdot\sin \phi_p \qquad (11)$$

The two trains $f_3$ and $f_2$ are applied to a subtractor 71 and the output $f_3-f_2$ is used to drive a stepping motor 72 to position an output shaft 73 continually to represent $\phi_p$. That is the shaft 73 positions disc 67 to maintain $f_3-f_2=0$. This servo action is analagous to the ball resolver action previously described.

It should be noted that the original driving source of pulses for both $f_3$ and $f_2$ is the same and that any small drift in the source would not affect the accuracy of the output.

In a similar manner the binary coded disc 62 and a gate 74 provide a pulse train $$f_4=k_5\cdot\sin \sigma \qquad (12)$$

and this is applied to a subtractor 75. Binary coded disc 67 and a gate 76 provide a pulse train $$f_5=k_6\cdot\cos \phi_p \qquad (13)$$

which is applied to scaler 77 to produce $$f_5, \frac{f_5}{2}, \frac{f_5}{4} \cdots \frac{f_5}{2^n}$$

A binary coded disc 78 has its shaft positioned to represent $\Delta\lambda$ and in conjunction with a gate 80 provides a pulse train $$\begin{aligned} f_6&=k_7\cdot f_5\cdot\sin \Delta\lambda \\ &=k_8\cdot\cos \phi_p\cdot\sin \Delta\lambda \end{aligned} \qquad (14)$$

The pulse train $f_6$ is applied to the subtractor 75 which produces an output of $f_4-f_6$ to drive a stepping motor 81 to position shaft 82 to represent $\Delta\lambda$. The shaft 82 is connected to position disc 78 to provide $f_6$ such that $f_4-f_6$ is maintained equal to zero. Shaft 82 also drives one input to differential 83 and the other input is positioned to represent $\lambda_o$. The shaft position output from differential 83 represents $\lambda_p$.

Thus the computer apparatus of FIGURE 5 provides as outputs $\phi_p$ and $\lambda_p$. The accuracy of the digital system can, of course, be made much more accurate than the analog computer system. However, the analog computer is compact, reliable, and convenient to use.

It is believed the computer apparatus described herein is of a novel design providing a convenient and accurate rate multiplication while requiring only shaft position inputs and supplying shaft position outputs. Further, the output is not directly dependent on the source of driving power.

I claim:

1. Computer apparatus for solving an equation of the form $f(C)=f(A)\cdot f(B)$ for C where $f(C)$, $f(A)$ and $f(B)$ are functions of C, A, and B respectively comprising first, second and third function generators each having at least a driving input, a positional input and a rate output, rate motor means connected to the driving input of said first and second function generators to drive said first and second function generators at the same speed, means applying positional signals representing A and B to the positional inputs of said first and third function generators respectively, said first function generator forming a rate output signal $f(A)$ at its output, means connecting the output of said first function generator to the driving input of said third function generator to drive said third function generator at a rate $f(A)$, said third function generator forming a rate output signal $f(A)\cdot f(B)$ at its output, means applying a positional signal C to the position input of said second function generator, said second function generator forming a rate output signal $f(C)$ at its output, differential means connected to the outputs of said third and second function generators respectively receiving therefrom a signal $f(A)\cdot f(B)$ and a signal $f(C)$, and forming a positional signal C as an output and as a feedback signal for the positional input of said second function generator.

2. Computer apparatus for solving an equation of the form $f(C)=f(A)\cdot f(B)$ for C where $f(C)$, $f(A)$ and $f(B)$ are trigonometric functions of C, A, and B respectively, comprising first, second and third mechanical trigonometric resolvers each having a rotational driving input, a shaft position input and a rate output, rate motor means connected to the driving input of said first and second resolvers to drive said first and second resolvers at a speed $\omega$, means applying shaft position signals representing A and B to the positional inputs of said first and third resolvers respectively, said first resolver forming an output signal $\omega\cdot f(A)$ at its output, means connecting the output of said first resolver to the driving input of said third resolver to drive said third resolver at a speed $\omega\cdot f(A)$, said third resolver forming an output signal $\omega\cdot f(A)\cdot f(B)$ at its output, means applying a shaft position signal representing C to the positional input of said second resolver, said second resolver forming an output signal $\omega\cdot f(C)$ at its output, differential means connected to the outputs of said third and second resolves respectively receiving therefrom a signal $\omega\cdot f(A)\cdot f(B)$ and a signal $\omega\cdot f(C)$ and forming a shaft position output signal C as an output and as a feedback signal for the shaft position input of said second resolver.

3. Computer apparatus as defined in claim 2 in which said first, second and third resolvers are ball resolvers.

4. A navigational computer for receiving signals $\Delta\mu$ and $\sigma$ representing north-south and east-west coordinates of a position in a transverse grid reference system with respect to a reference point having a latitude $\mu_o$ and a longitude $\lambda_o$, and for providing output signals $\phi_p$ and $\lambda_p$ representing latitude and longitude of said position, comprising a first and a second trigonometric resolver each having a driving input, a shaft position input, and first and second rate outputs, rate motor means connected to the driving inputs of said first and second resolvers to drive said first and second resolvers at the same rate $\omega$, means applying a shaft position input signal representing $\sigma$ to the shaft position input of said first resolver, said first resolver forming output signals $\omega$.sin $\sigma$ and and $\omega$.cos $\sigma$ at its first and second outputs respectively, a third trigonometric resolver having a driving input, a shaft position input, and a rate output, means connecting the second output of said first resolver to the driving input of said third resolver to drive said third resolver at a rate representing $\omega$.cos $\sigma$, means applying a shaft position input signal representing $\mu_p=\mu_o+\Delta\mu$ to the shaft position input of said third resolver, said third resolver forming a signal $\omega$.cos $\sigma$. sin $\mu_p$ at its output, means applying a shaft position signal representing $\phi_p$ to the shaft position input of said second resolver, said second resolver forming an output signal representing $\omega$.sin $\phi_p$ at its second output, first differential means connected to the output of said third resolver to receive said signal $\omega$.cos $\sigma$. sin $\mu_p$ and to the first output of said second resolver to receive said signal $\omega$.sin $\phi_p$ and to form a shaft position signal $\phi_p$ as an output and as a feedback signal for the shaft position input of said second resolver, a fourth trigonometric resolver having a driving input, a shaft position input, and a rate output, means connecting said second output of said second resolver to the driving input of said fourth resolver to drive said fourth resolver at a rate representing $-\omega$.cos $\phi_p$, means applying a shaft position input signal representing $\Delta\lambda=\Delta_o-\lambda_p$ to the shaft position input of said fourth resolver, said fourth resolver forming a signal $-\omega$.cos $\phi_p$.sin $\Delta\lambda$ at its output, second differential means connected to said first output of said first resolver to receive said signal $\omega$.sin $\sigma$ and to the output of said fourth resolver to receive said signal $-\omega$.cos $\phi_p$.sin $\Delta\lambda$ and to form a shaft position signal $\Delta\lambda$ as an output and as a feedback signal for the shaft position input of said fourth resolver, and means connected to said second differential means to receive said shaft position signal $\Delta\lambda$ and having means to receive a shaft position signal $\lambda_o$ and to form therefrom an output signal $\lambda_p=\lambda_o-\Delta\lambda$.

5. A navigational computer for receiving signals $\Delta\mu$ and $\sigma$ representing north-south and east-west coordinates of a position in a grid reference system with respect to a reference point having a latitude $\mu_o$ and a longitude $\lambda_o$, and for providing output signals $\phi_p$ and $\lambda_p$ representing latitude and longitude of said position, comprising means to introduce into the computer as shaft position inputs signals representing $\Delta\mu$, $\sigma$, $\mu_o$ and $\lambda_o$, a first differential means connected to receive said signals $\mu_o$ and $\Delta\mu$ and to form an output shaft position signal $\mu_p=\mu_o\Delta\mu$, a rate motor having a driving output rotating at a speed $\omega$, a first ball resolver having a ball driving input connected to said rate motor, a shaft position input to receive said signal $\sigma$, and first and second outputs, and being constructed and arranged to form signals $\omega$.sin $\sigma$ and $\omega$.cos $\sigma$ at said first and second outputs respectively, a second ball resolver having a driving input connected to said second output of said first resolver, a shaft position input to receive said signal $\mu_p$ and an output and being constructed and arranged to form a signal $\omega$.cos $\sigma$.sin $\mu_p$ at its output, a third ball resolver having a ball driving input connected to said rate motor, a shaft position input to receive a signal $\phi_p$, and first and second outputs, and being constructed and arranged to form signals $\omega$.sin $\phi_p$ and $\omega$.cos $\phi_p$ at its first and second outputs respectively, second differential means connected to the output of said second resolver and to the first output of said third resolver to receive said signals $\omega$.cos $\sigma$.sin $\mu_p$ and $\omega$.sin $\phi_p$ and to form a shaft position signal $\phi_p$ as an output and as a feedback signal for the shaft position input of said said third ball resolver, a fourth ball resolver having a ball driving input connected to the second output of said third ball resolver, a shaft position input to receive a signal $\Delta\lambda=\lambda_o-\lambda_p$, and an output, and being constructed and arranged to form a signal $-\omega$.cos $\phi_p$.sin $\Delta\lambda$ at its output, third differential means connected to the first output of said first resolver and to the output of said fourth resolver to receive said signals $\omega.\sin \sigma$ and $$-\omega.\cos \phi_p.\sin \Delta\lambda$$

and to form a shaft position signal $\Delta\lambda$ as an output and as a feedback signal for the shaft position input of said fourth resolver, and fourth differential means connected to the output of said third differential means to reecive said signal $\Delta\lambda$ and connected to receive said input signal $\lambda_o$ and to form therefrom an output signal $\lambda_p=\lambda_o-\Delta\lambda$.

6. Computer apparatus for solving an equation of the form $f(C)=f(A).f(B)$ for C, where $f(C)$, $f(A)$ and $f(B)$ are trigonometric functions of C, A and B respectively, comprising first, second and third binary coded disc means each including an associated gate, each said binary coded disc means having a positional input for rotating the respective disc, a driving input to said gate and an output from said gate, a pulse generator and scaler for generating a series of pulse frequencies, means connecting said scaler to said driving input of the gates of said first and second binary coded disc means for applying thereto said pulse frequencies, means applying positional signals representing A and B to the positional inputs of said first and third binary coded disc means, said first binary coded disc means modifying said series of pulse frequencies applied to the gate thereof to provide at the gate output a pulse train representing $f(A)$, means connecting the gate output of said first binary coded disc means to the driving input of the gate of said third binary coded disc means, said third binary coded disc means modifying the pulse train applied to the gate thereof to provide at the gate output a pulse train representing $f(A).f(B)$, means applying a positional signal representing C to the positional input of said second binary coded disc means, said second binary coded disc means modifying said series of pulse frequencies applied to the gate thereof to provide at the gate output a pulse train representing $f(C)$, subtractor means connected to the gate outputs of said third and second binary coded disc means respectively receiving therefrom pulse trains representing $f(A).f(B)$ and $f(C)$ and forming a pulse output representing C, a step motor connected to the output of said subtractor means for actuation by said pulse output representing C and having a shaft output representing C, the shaft position of said step motor being used to provide a positional output C and to provide a feedback drive for the positional input of said second binary coded disc means.

7. Computer apparatus as defined in claim 6 in which the series of pulse frequencies is $$f, \frac{f}{2}, \frac{f}{2^2} \cdots \frac{f}{2^n}$$

where $n$ is selected to provide the required accuracy and $f$ is any frequency.

References Cited

UNITED STATES PATENTS 3,267,270 8/1966 Smidowicz ---------- 235—186

MALCOLM A. MORRISON, *Primary Examiner.*

A. J. SARLI, J. RUGGIERO, *Assistant Examiner.*